(12) United States Patent
Ebrom et al.

(10) Patent No.: US 10,281,202 B1
(45) Date of Patent: *May 7, 2019

(54) REFRIGERATOR HAVING A CAMERA SELECTIVELY ENCLOSED BY A ROTATING MULLION ASSEMBLY

(71) Applicant: WHIRLPOOL CORPORATION, Benton Harbor, MI (US)

(72) Inventors: Matthew Ebrom, Holland, MI (US); Neomar Giacomini, St. Joseph, MI (US); Donald Gilmore, Berrien Springs, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,801

(22) Filed: Apr. 30, 2018

Related U.S. Application Data

(63) Continuation of application No. 15/782,144, filed on Oct. 12, 2017, now Pat. No. 9,995,528.

(51) Int. Cl.
| | |
|---|---|
| *G03B 17/00* | (2006.01) |
| *F25D 29/00* | (2006.01) |
| *F25D 23/04* | (2006.01) |
| *F25D 21/04* | (2006.01) |
| *F25D 23/06* | (2006.01) |
| *H04N 5/232* | (2006.01) |

(52) U.S. Cl.
CPC ............ *F25D 29/005* (2013.01); *F25D 21/04* (2013.01); *F25D 23/04* (2013.01); *F25D 23/069* (2013.01); *H04N 5/23222* (2013.01); *F25D 2400/06* (2013.01); *F25D 2500/06* (2013.01); *F25D 2700/02* (2013.01)

(58) Field of Classification Search
USPC ......................................................... 396/427
See application file for complete search history.

(56) References Cited

U.S. PATENT DOCUMENTS

| | | | |
|---|---|---|---|
| 9,285,162 B2 | 3/2016 | Ryu et al. | |
| 9,503,635 B2 | 11/2016 | Ryu et al. | |
| 9,995,528 B1 * | 6/2018 | Ebrom | F25D 23/06 |

(Continued)

FOREIGN PATENT DOCUMENTS

| | | |
|---|---|---|
| CN | 106225367 | 12/2016 |
| EP | 2975344 A1 | 1/2016 |
| WO | 2017039295 A1 | 3/2017 |

*Primary Examiner* — Rodney E Fuller
(74) *Attorney, Agent, or Firm* — Price Heneveld LLP

(57) ABSTRACT

A refrigerator includes a cabinet having a storage compartment with a door pivotally coupled the cabinet between open and closed positions. A mullion assembly is operably coupled to the door between retracted and deployed positions relative to the door. The mullion assembly includes at least one receiving recess disposed on an inner surface thereof. At least one camera device is mounted on an inside edge of the door and vertically aligned with the at least one receiving recess of the mullion assembly, such that the camera device faces into the storage compartment when the first door is in the closed position, and is received in the receiving recess of the mullion assembly when the mullion assembly is in the retracted position. The camera device may also be mounted to a fixed portion of a hinge assembly that interconnects the mullion assembly and the door.

20 Claims, 5 Drawing Sheets

(56) References Cited

U.S. PATENT DOCUMENTS

2016/0033194 A1    2/2016   Sumihiro et al.
2016/0047587 A1    2/2016   Sasaki et al.
2016/0057394 A1    2/2016   Marutani et al.
2016/0116207 A1    4/2016   Yamato et al.

\* cited by examiner

REFRIGERATOR HAVING A CAMERA SELECTIVELY ENCLOSED BY A ROTATING MULLION ASSEMBLY

CROSS-REFERENCE TO RELATED APPLICATION

This application is a continuation of U.S. patent application Ser. No. 15/782,144, (now U.S. Pat. No. 9,995,528), filed on Oct. 12, 2017, entitled REFRIGERATOR HAVING A CAMERA SELECTIVELY ENCLOSED BY A ROTATING MULLION ASSEMBLY, the entire disclosure of which is hereby incorporated by reference.

BACKGROUND

Bottom mount refrigerators often include French-style doors to enhance access to a refrigerated storage compartment. Some refrigerators also include image sensors, such as cameras, for viewing images of the storage compartment. These images sensors can be mounted of the sidewalls of the storage compartment or on the doors of the refrigerator. In the cold environment of a refrigerated storage compartment, cameras are exposed to condensation when warmer humid air enters the storage compartment when opening the refrigerator doors. Exposed camera lenses can become foggy due to the condensation, thereby affecting the quality of the image taken by the camera. Even when the doors are closed, the condensation can take a considerable amount of time to dissipate from the camera lens in the cold environment of the refrigerated storage compartment. Thus, a system for enclosing a camera assembly when the doors of a refrigerator are opened is desired. Further, an accessible location for the cameras is desired to increase access to the cameras for servicing.

BRIEF SUMMARY OF THE DISCLOSURE

According to one aspect of the disclosure, a refrigerator includes a storage compartment having an open front portion with first and second doors operable between open and closed positions with respect to the open front portion of the storage compartment. A mullion assembly is pivotally coupled to one of the first and second doors by at least one hinge assembly, such that the mullion assembly is operable between retracted and deployed positions. The mullion assembly includes at least one receiving recess. At least one camera device is mounted on the at least one hinge assembly and vertically aligned with the at least one receiving recess of the mullion assembly. The at least one camera device includes a lens assembly facing into the storage compartment when the door to which the mullion assembly is mounted is in the closed position. The at least one camera device is at least partially received in the at least one receiving recess of the mullion assembly when the mullion assembly is in the retracted position.

According to another aspect of the present disclosure, a refrigerator includes a cabinet having a storage compartment with first and second doors operably coupled to the cabinet between open and closed positions. The first and second doors each include inner edges spaced-apart from one another when the first and second doors are in the closed position. A hinge assembly having a first hinge element is mounted to the first door, wherein the hinge assembly further includes a second hinge element pivotally coupled to the first hinge element. A mullion assembly includes a mullion bar coupled to the second hinge element of the hinge assembly for movement between retracted and deployed positions. The mullion bar is substantially perpendicular to the first door when the mullion assembly is in the retracted position, and the mullion assembly includes at least one receiving recess. A camera device is mounted on the first hinge element and vertically aligned with the receiving recess of the mullion bar. The camera device faces into the storage compartment when the first door is in the closed position, and the camera device is at least partially received in the receiving recess of the mullion bar when the mullion bar is in the retracted position.

According to yet another aspect of the present disclosure, a refrigerator includes a cabinet having a storage compartment with a door pivotally coupled the cabinet between open and closed positions to selectively provide access to the storage compartment. A mullion assembly is operably coupled to the door between retracted and deployed positions relative to the door, wherein the mullion assembly includes at least one receiving recess disposed on an inner surface thereof. At least one camera device is mounted on an inside edge of the door and vertically aligned with the at least one receiving recess of the mullion assembly, such that the camera device faces into the storage compartment when the first door is in the closed position, and is received in the receiving recess of the mullion assembly when the mullion assembly is in the retracted position.

These and other features, advantages, and objects of the present disclosure will be further understood and appreciated by those skilled in the art by reference to the following specification, claims, and appended drawings.

BRIEF DESCRIPTION OF THE DRAWINGS

The foregoing summary, as well as the following detailed description of the disclosure, will be better understood when read in conjunction with the appended drawings. For the purpose of illustrating the disclosure, certain examples are shown in the drawings. It should be understood, however, that the disclosure is not limited to the precise arrangements and instrumentalities shown. Drawings are not necessarily to scale. Certain features of the disclosure may be exaggerated in scale or shown in schematic form in the interest of clarity and conciseness.

DETAILED DESCRIPTION

As required, detailed examples of the present disclosure are disclosed herein.

However, it is to be understood that the disclosed examples are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

It is to be understood that the present disclosure is not limited to the particular examples described below, as variations of the particular examples may be made and still fall within the scope of the appended claims. It is also to be understood that the terminology employed is for the purpose of describing particular examples, and is not intended to be limiting. Instead, the scope of the present disclosure will be established by the appended claims.

Figure 1:
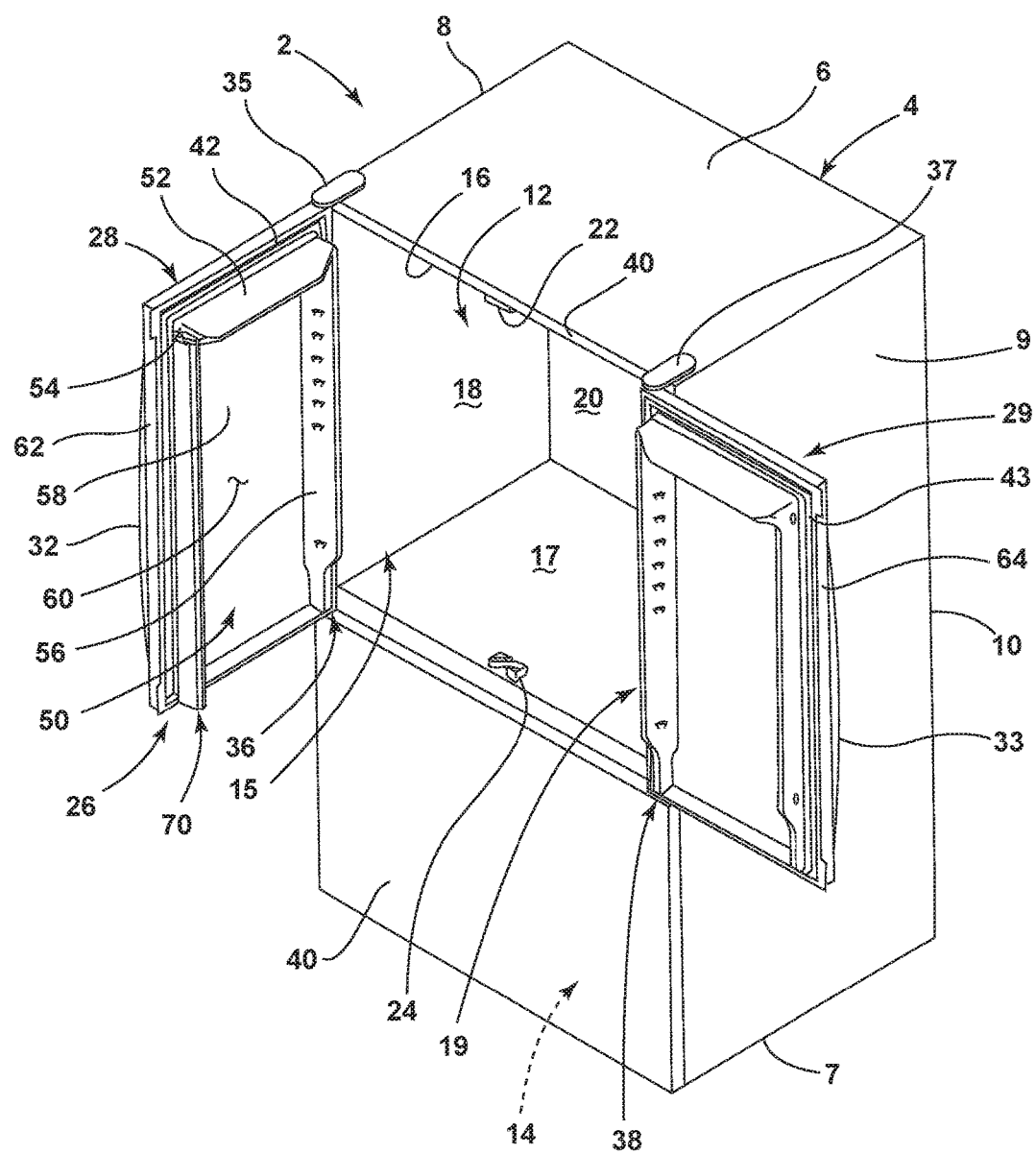
FIG. 1 is a top perspective view of a bottom mount refrigerator having first and second French-style doors shown in an open position and a mullion assembly coupled to the first door.

For purposes of description herein, the terms "upper," "lower," "right," "left," "rear," "front," "vertical," "horizontal," and derivatives thereof shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary examples of the inventive concepts defined in the appended claims. Hence, specific dimensions and other physical characteristics relating to the examples disclosed herein are not to be considered as limiting, unless the claims expressly state otherwise.

Referring now to FIG. 1, reference numeral 2 generally designates a bottom-mount refrigerator for use with the present concept. The refrigerator 2 includes a cabinet 4 having a top wall 6, a bottom wall 7, opposing sidewalls 8 and 9, and a rear wall 10 which cooperate to define first and second compartments 12 and 14. In the embodiment shown in FIG. 1, the first compartment 12 is disposed above the second compartment 14. As shown, the first compartment 12 includes a liner 15 having a top wall 16, a bottom wall 17, opposing sidewalls 18 and 19 and a rear wall 20. A first guide member 22 is shown disposed on a front portion of top wall 16, and a second guide member 24 is shown disposed on a front portion of the bottom wall 17. The first and second guide members 22, 24 define upper and lower guide members for guiding rotational movement of a mullion assembly as further described below.

Although not specifically identified, the refrigerator 2 includes a refrigeration system for providing above and below freezing temperatures in compartments 12 and 14, respectively. Thus, in the embodiment of FIG. 1, it is contemplated that the first compartment 12 is a fresh food storage compartment, while the second compartment 14 is a freezer compartment. It is further contemplated that the open space configuration of the first compartment 12 may include various shelves, drawers and bins for dividing the open space and for storing items to be refrigerated in a manner known in the art. In FIG. 1, the second compartment 14 is selectively accessed via a door 30 which may be a sliding drawer-style door. Thus, the refrigerator 2 is a bottom mount refrigerator with lower freezer door 30 being adapted to slide in and out of the cabinet 4 to provide access to frozen items stored within second compartment 14.

As further shown in FIG. 1, the refrigerator 2 includes an upper door assembly 26 which, is shown in a French-style door configuration including first and second doors 28 and 29. The first and second doors 28 and 29 are provided with respective handles 32, 33 to enable a consumer to open the first and second doors 28, 29 to selectively provide access to the first compartment 12. Specifically, the first and second doors 28, 29 are pivotally coupled to the cabinet 4 at upper and lower hinge assemblies 35 and 36, 37 and 38, respectively. The first and second doors 28, 29 are adapted to seal against an open front face portion 40 of the cabinet 4 in an air-tight manner to prevent cold air from escaping the first compartment 12. Specifically, the first and second doors 28, 29 seal against the open front face 40 of the cabinet 4 via flexible gasket assemblies 42, 43, respectively, which may be elastomeric assemblies that may include sealing magnetic members disposed therein.

Except as otherwise identified below, the structure of each of the first and second doors 28, 29 is substantially identical, however, reversed in configuration as known in the art. Therefore, a detailed description of the basic structure of the first door 28 is herein provided and it is to be understood that the second door 29 has a reciprocal structure. As shown in FIG. 1, the first door 28 includes a door liner 50 having an outwardly projecting top portion 52, and outwardly projecting first and second side portions 54, 56 disposed on opposite sides of the top portion 52. A rear portion 58 interconnects the top portion 52 and the first and second side portions 54, 56 to collectively define a storage cavity 60. Within the storage cavity 60, it is contemplated that a variety of shelf members, i.e. adjustable shelves, bins, storage units and the like, can be positioned within the storage cavity 60 as supported between the opposing side portions 54, 56.

As further shown in FIG. 1, the first and second doors include inside edges 62, 64, respectively, which are configured to seal against a mullion assembly 70 when the doors 28, 29 are in a closed position. The mullion assembly 70 is shown in an inwardly rotated position, which is provided by the first and second guide members 22, 24 interacting with the mullion assembly 70 as the first door 28 moves to the open position. Thus, the mullion assembly 70 is pivotally coupled to the first door 28 for rotation between retracted and deployed positions, as further described below. While the mullion assembly 70 is shown coupled to the first door 28, it is also contemplated that the mullion assembly 70 can be mounted to the second door 29, such that the present concept is not to be limited to a specific right or left door mounting of the mullion assembly 70.

Figure 2:
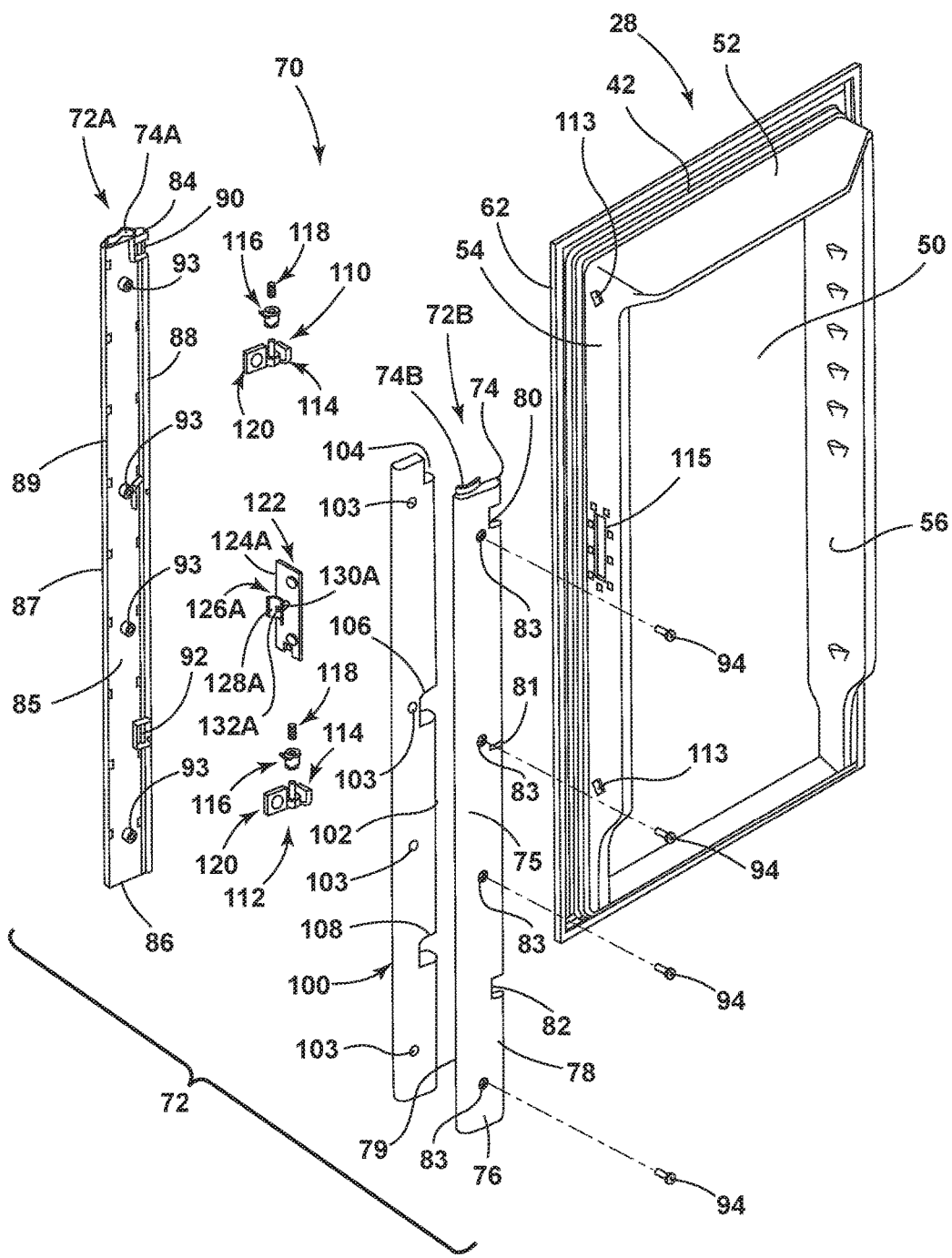
FIG. 2 is a top perspective view of the first door of FIG. 1 as removed from the refrigerator and an exploded view of the mullion assembly.

Referring now to FIG. 2, the mullion assembly 70 is shown in an exploded view and includes a multi-part mullion bar 72 comprised of first and second cover members 72A, 72B, which are preferably comprised of molded plastic. As shown in the embodiment of FIG. 2, the second cover member 72B defines an inner portion of the mullion bar 72 and includes a first end 74, a second end 76, and an interconnecting transverse web portion 75. The first end 74 is provided with an outwardly extending guide pin 74B for use as further described below. The second cover member 72B further includes inner and outer edges 78, 79, wherein the inner edge 78 includes a plurality of receiving recesses 80, 82 disposed therealong with a receiving slot 81 disposed therebetween. The second cover member 72B further includes a plurality of mounting apertures 83 disposed through the transverse web portion 75. As used throughout this disclosure, the mullion assembly 70 and the mullion bar 72 may be described as being operable between retracted and deployed positions. The retracted and deployed positions of the mullion assembly 70 is meant to convey the pivoting movement of the mullion bar 72 as a main feature of the mullion assembly 70.

As further shown in the embodiment of FIG. 2, the first cover member 72A defines an outer portion of the mullion bar 72 and includes a first end 84, a second end 86, and an interconnecting transverse web portion 85. As providing an outer portion of the mullion bar 72, the first cover member 72A defines a sealing surface at an outer surface 87 of the transverse web portion 85 for the gasket assemblies 42, 43 of the first and second doors 28, 29 to seal against when the first and second doors 28, 29 are closed and the mullion bar 72 is in the deployed position. The first end 84 of the first cover member 72A is provided with an outwardly extending guide pin portion 74A for use as further described below. The first cover member 72A further includes inner and outer edges 88, 89, wherein the inner edge 88 includes a plurality of engagement members 90, 92 disposed therealong. The first cover member 72A further includes a plurality of mounting bosses 93 disposed through the transverse web portion 85. In assembly, the first and second cover members 72A, 72B are configured to couple to one another to define a unitary mullion bar 72. The first and second cover members 72A, 72B couple to one another using fasteners 94 which are received through mounting apertures 83 of the second cover member 72B and threadingly engage mounting bosses 93 of the first cover member 72A. When the first and second cover members 72A, 72B are coupled to one another, the inner and outer edges 78, 88 and 79, 89 thereof aligned with one another as well as the first and second ends 74, 84 and 76, 86 thereof. The outwardly extending guide pins portions 74A, 74B of the first and second cover members 72A, 72B also aligned to provide a unitary guide pin for engaging the guide member 22 disposed on the top wall 16 of the liner 15 shown in FIG. 1. The unitary guide pin engages the guide member 22 to induce rotational movement of the mullion bar 72 between the retracted position and the deployed position, in a manner as known in the art, when the first door 28 (to which the mullion bar 72 is hingedly coupled) is moved between open and closed positions. It is further contemplated that a lower guide pin assembly can be disposed on the second ends 86, 76 of the first and second cover members 72A, 72B, respectively for engage guide member 24 disposed on the bottom wall 17 of the liner 15 (FIG. 1) for further guiding rotational movement of the mullion assembly 70.

As further shown in FIG. 2, an insulating member 100 is configured to be received between the first and second cover members 72A, 72B when the first and second cover members 72A, 72B are coupled to one another. The insulating member 100 includes a plurality of receiving apertures 103 through which fasteners 94 are received through when coupling the first and second cover members 72A, 72B to one another. The insulating member 100 further includes an inner edge 102 having a plurality of recesses 104, 106 and 108 disposed therealong. When the first and second cover members 72A, 72B are coupled to one another, the receiving recesses 80, 82 of the second cover member 72B align with the recesses 104, 108 of the insulating member 100. Recess 106 of the insulating member 100 is configured to receive a portion of a pivot member as further described below. Further, when the first and second cover members 72A, 72B are coupled to one another, the engagement members 90, 92 of the first cover member 72A are also aligned with the receiving recesses 80, 82 of the second cover member 72B. In coupling the mullion bar 72 to the first door 28, a number of hinge assemblies 110, 112 are used to interconnect the first door 28 to the mullion bar 72. While two hinge assemblies (110, 112) are shown in the embodiment of FIG. 2, it is contemplated that more or fewer hinge assemblies may be used to couple the mullion bar 72 to the first door 28 in a pivoting manner, without departing from the present concept.

As further shown in FIG. 2, the hinge assemblies 110, 112 define upper and lower hinge assemblies for pivotally coupling the mullion bar 72 to the first door 28. Specifically, the hinge assemblies 110, 112 are configured to mount the mullion bar 72 to the outwardly projecting first side portion 54 of the liner 50 of the first door 28 at dovetail connectors 113, such that the mullion bar 72 is pivotally mounted adjacent to the inside edge 62 of the first door 28. A pivot member 122 is shown disposed between the first and second hinge assemblies 110, 112. The pivot member 122 includes a cover plate 124 in an outwardly extending pivot feature 126A having a curved outer pivot surface 128A extending outwardly from the cover plate 124 by a sleeve 130A. The sleeve 130A opens through the cover plate 124 at access aperture 132A. In this way, the sleeve 130A can be used to provide access for a control wire to power electrical features of the mullion bar 72, such as a heating element. In assembly, the pivot member 122 is mounted to an access aperture 115 disposed on the outwardly projecting first side 54 of the liner 50 of the first door 28. The sleeve 130A is further configured to be received through the receiving slot 81 of the second cover member 72B, such that the mullion bar 72 can pivot around the stationary pivot feature 126A, as engaged therewith at the curved outer pivoting surface 128A thereof.

As further shown in FIG. 2, the first and second hinge assemblies 110, 112 each include a first hinge element 114, a second hinge element 116, and a biasing mechanism 118 shown in the embodiment of FIG. 2 in the form of a coil spring. In use, the biasing mechanism 118 is configured to provide a biasing force to hold the second hinge element 116 against the first hinge element 114 as the second hinge element 116 rotates with the mullion bar 72, as coupled thereto. The first and second hinge assemblies 110, 112 are contemplated to be similar or identical in configuration, such that the description of the first hinge assembly 110 provided below with reference to FIG. 3 will also described the features of the second hinge assembly 112. As further shown in FIG. 2, each hinge assembly 110, 112 includes a camera device 120 mounted on the first hinge element 114. The camera device 120 is contemplated to be any type of image capturing device configured to take or record an image of the first compartment 12 (FIG. 1) and the contents stored by a user therein. It is further contemplated that more than one camera device 120 can be mounted on the hinge assemblies 112 for providing multiple views of the first compartment 12 from the same location. As noted above, the mullion assembly 70 can include more hinge assemblies than those shown in FIG. 2. Thus, it is further contemplated that all of the hinge assemblies, or select hinge assemblies of a plurality thereof, used to mount the mullion assembly 70 to the first door 28 can include a camera device, such as camera device 120, for viewing the first compartment 12 in a plurality of positions along the mullion assembly 70. Thus, a plurality of hinge assemblies, such as hinge assemblies 110, 112 can be mounted on the first door 28, and each assembly may include a camera device, such as camera devices 120. Further, the first door 28 may include a plurality of camera devices 120 fixedly mounted to the inside edge 62 of the first door 28 as further described below. It is contemplated that each camera device 120 of the plurality of camera devices is received in an associated receiving recess 80 of a plurality of receiving recesses disposed along the mullion assembly 70.

Figure 3:
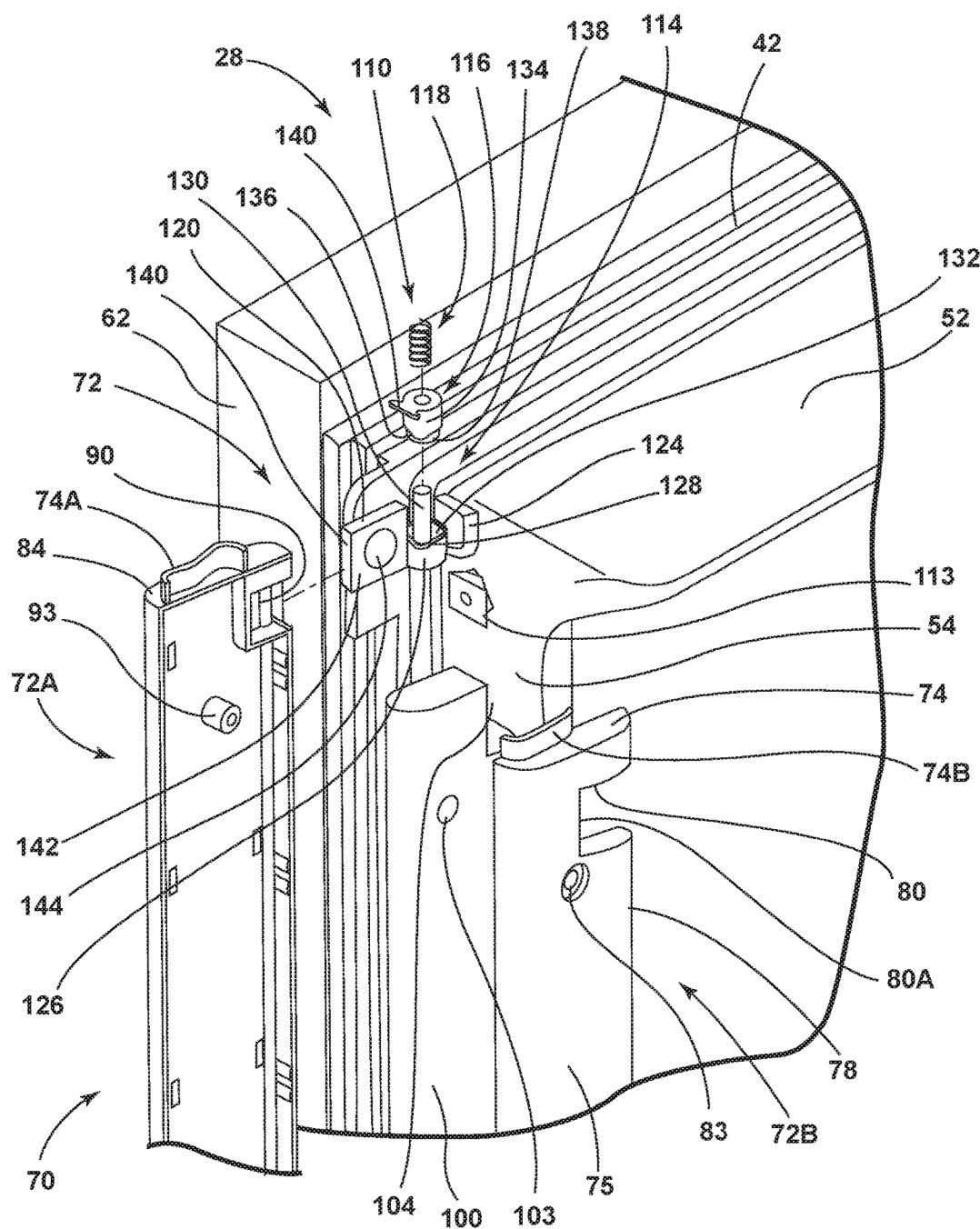
FIG. 3 is a partial top perspective view of the first door of FIG. 2 and an exploded view of an upper portion of mullion assembly having an image sensor.

Referring now to FIG. 3, the first hinge assembly 110 is shown with the first hinge element 114 having a base portion 124A interconnected with a first multi-lobed cam member 126 having an upper cam surface 128. In the embodiment shown, a hinge pin 130 projects upwardly from the first multi-lobed cam member 126 and is spaced-apart from first multi-lobed cam member 126 by an interior cavity 132. The first hinge assembly 110 is secured to the first door 28 by sliding the base portion 124A over the dovetailed connector 113 positioned on the first outwardly projecting side portion 54 of the first door 28 to fixedly mount the first hinge element 114 to the first door 28. As further shown in FIG. 3 the second hinge element 116 includes a second multi-lobed cam member 134 having a lower cam surface 136 and a downwardly extending base portion 138. The second multi-lobed cam member 134 further includes a mounting flange 140 adapted to interconnect with the mullion assembly 70 at the engagement member 90 of the first cover member 72A. The base portion 138 of the second hinge element 116 is shown as a cylindrical base portion adapted to be received in the interior cavity 132 of first hinge element 114. Specifically, the hinge pin 130 of the first hinge element 114 is configured to be received in the base portion 138 of the second hinge element, such that the first and second multi-lobed cam members 126, 134 can nest one within the other.

As further shown in FIG. 3, the biasing mechanism 118, preferably a coil spring, is adapted to provide a biasing force for holding the second hinge element 116 against the first hinge element 114, such that the upper and lower cam surfaces 128, 136 are in contact with another as the mullion assembly 70 moves between the retracted and deployed positions. As coupled to the mullion assembly 70, the second hinge element 116 is configured to pivot relative to the first hinge element 114. As mounted to the outwardly projecting side portion 54 of the first door 28, the first hinge element 114 is fixedly mounted to the first door 28 and is stationary during movement of the mullion assembly 70. As mounted to the first hinge element 114, the camera device 120 is also stationary during movement of the mullion assembly 70. The camera device 120 includes a body portion 140 having an inwardly facing front surface 142 with a lens assembly 144 disposed thereon. As configured in this manner, the camera device 120 faces inwardly into the first compartment 12 of the refrigerator 2 when the first door 28 is in the closed position. Further, it is contemplated that portions of the first hinge assembly 110 are received within the receiving recess 80 including the camera device 120, as further described below. As further shown in FIG. 3, the receiving recess 80 includes an inner wall 80A which is configured to cover the camera device 120 when the mullion assembly 70 is in the retracted position, as further described below.

Figure 4:
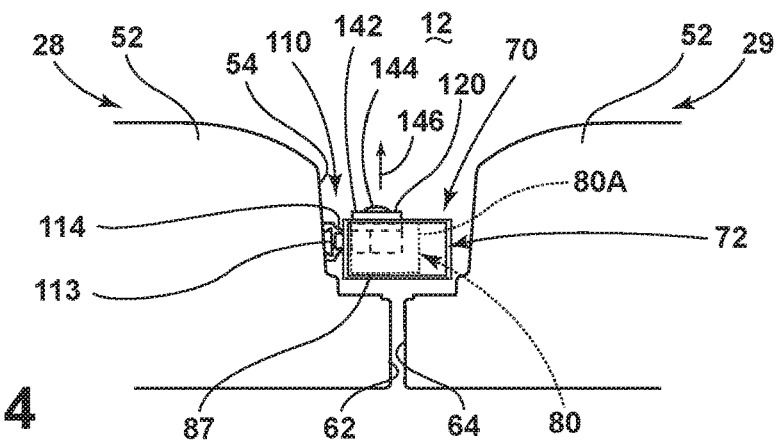
FIG. 4 is a top plan view of the first and second French-style doors and the mullion assembly of FIG. 1 in a closed position, with an image sensor facing inwardly.

Referring now to FIG. 4, the first and second doors 28, 29 are shown in a closed position, such that the inside edges 62, 64 thereof are disposed adjacent to one another. The outer surface 87 of the mullion assembly 70 is shown providing a sealing surface for the first and second doors 28, 29 at the inside edges 62, 64 thereof. Thus, mullion assembly bridges a gap defined between inner edges 62, 64 of the first and second doors 28, 29 when the mullion assembly 70 is in the deployed position and the first and second doors 28, 29 are in the closed position. It is contemplated that the gasket assemblies 42, 43 surrounding the first and second doors 28, 29 are positioned between the first and second doors 28, 29 (as coupled thereto) and the sealing surface 87 of the mullion assembly 70 when the mullion assembly 70 is in the deployed position and the first and second doors 28, 29 are in the closed position. Thus, in FIG. 4, the mullion assembly 70 is in the deployed position, wherein the mullion bar 72 is fully extended outwardly from the first hinge element 114 of the first hinge assembly 110 to seal against the first and second doors 28, 29. With the mullion assembly 70 in the deployed position, the camera device 120 is exposed, such that the front surface 142 and the lens assembly 144 having an unimpeded view into the first compartment 12 in the direction as indicated by arrow 146. As further shown in FIG. 4, portions of the first hinge assembly 112 are shown received within the recess 80 of the mullion bar 72 of the mullion assembly 70. The first hinge assembly 110 is shown mounted to the outwardly projecting side portion 54 of the first door 28. In the embodiment of FIG. 4, the outwardly projecting side portion 54 of the first door 28 makes up a portion of the inside edge 62 of the first door 28.

Figure 5:
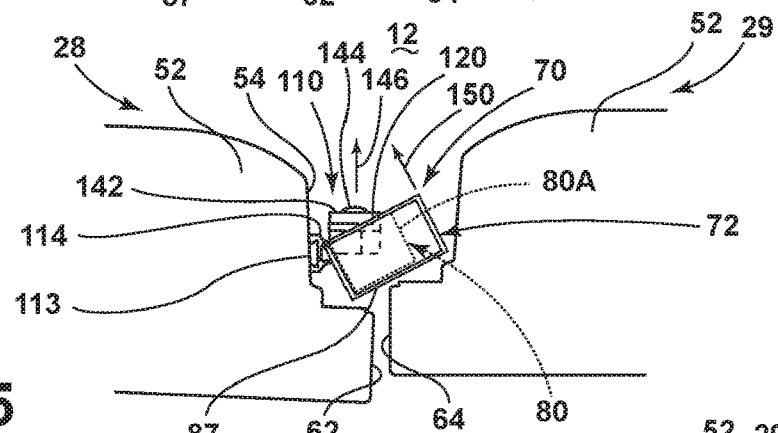
FIG. 5 is a top plan view of the doors and mullion assembly of FIG. 4 showing the first door moving towards an open position with the second door remaining in a closed position, and further showing rotation of the mullion assembly towards an inwardly rotated position over the image sensor.

Referring now to FIG. 5, as the first door 28 moves towards the open position from the closed position shown in FIG. 4, the mullion bar 72 may contact the inner portion 64 of the second door 29 to rotate the mullion assembly 70 from the deployed position (shown in FIG. 4) towards the retracted position. Further, it is contemplated that the unitary guide pin defined by the first and second guide pin portions 74A, 74B of the first and second cover members 72A, 72B of the mullion bar 72 can interact with the guide member 22 disposed within the first compartment 12 to move the mullion assembly 70 towards the retracted position as the first door 28 opens, in a manner as known in the art. Moving the mullion assembly 70 towards the retracted position involves in an inward rotational movement of the mullion assembly 70 towards the inside edge 62 of the door 28 along the path as indicated by arrow 150.

Figure 6:
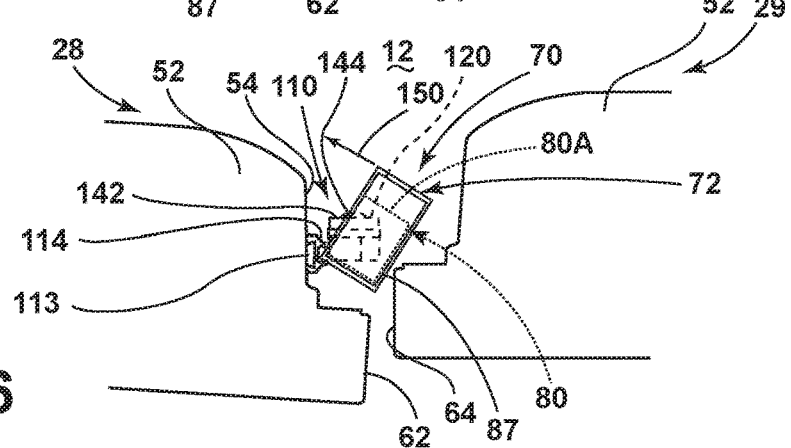
FIG. 6 is a top plan view of the doors and mullion assembly of FIG. 5 showing the first door moving further towards the open position with the second door remaining in the closed position, and the mullion assembly rotated further towards the inwardly rotated position over the image sensor.

Referring now to FIG. 6, the mullion assembly 70 continues to move along the inwardly directed rotational path as indicated by arrow 150 towards the retracted position, while portions of the first hinge assembly 110 and the camera device 120 are shielded within the receiving recess 80 of the mullion bar 72.

Figure 7:
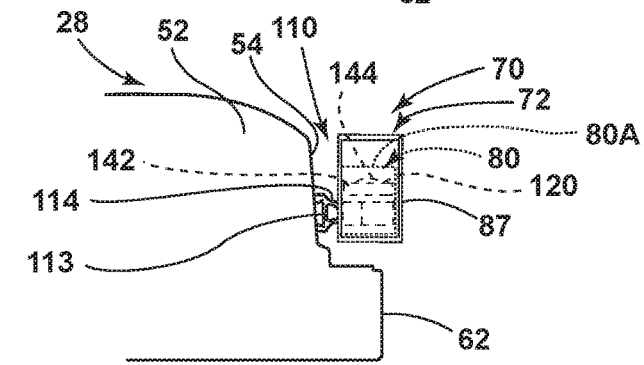
FIG. 7 is a top plan view of the first door and mullion assembly of FIG. 6 showing the first door in the open position, and the mullion assembly fully rotated to the inwardly rotated position, thereby covering the image sensor.

Referring now to FIG. 7, the mullion assembly 70 is shown in the fully retracted position, such that the first door 28 is contemplated to be moved away from the cabinet 4 of the refrigerator 2 to the open position as shown in FIG. 1. When the mullion assembly 70 is in the retracted position, the mullion assembly 70 is substantially perpendicular to the first door 28. With the mullion assembly 70 in the fully retracted position, the camera device 120, along with the lens assembly 144 thereof, is fully received within the receiving recess 80 of the mullion bar 72, such that the camera device 120 is protected by the mullion assembly 70 from the warmer humid air of the external environment surrounding the refrigerator 2. Specifically, the camera device 120 is covered by the inner wall 80A of the recess 80 when the mullion assembly 70 is in the fully retracted position. In this way, the camera device 120 is less susceptible to condensation by exposure to the external environment of the refrigerator 2 when the first door 28 is in the open position. Thus, as shown in FIGS. 4-7, the camera device 120 remains stationary as mounted to the first hinge assembly 110 at the fixedly mounted first hinge element 114 thereof as the mullion assembly 70 rotates. Thus, the camera device 120 moves with the first door 28 as the first door 28 rotates between open and closed positions, but the camera device 120 does not change orientation with respect to the first door 28 as mounted to a fixed portion (the first hinge element 114) thereof.

As noted above, the camera device 120 is positioned within the storage cabinet 112, such that the lens assembly 144 is pointed inwardly into the first compartment 12 in the direction as indicated by arrow 146 in FIG. 4. With the camera device 120 exposed to the first compartment 12, the camera device is cooled, much like the items stored in the first compartment 12, by the refrigeration system of the refrigerator 2. As such, when the first door 28 is opened, the camera device 120 is susceptible to exposure to the warm humid air of the external environment of the refrigerator 2 as compared to the cooled air of the first compartment 12. With the mullion assembly 70 shielding the camera device 120 from the external environment, condensation is less likely to develop on the cooled camera device 120 when the first door 28 is opened. In this way, when the first door 28 is closed and the mullion assembly 70 returns to the deployed position (FIG. 4) as guided by the guide member 22 and the guide pin portions 74A, 74B, the camera device 120 will again be position with an inward view of the first compartment 12 and will be prepared for immediate viewing of the first compartment 12 having avoided significant condensation development on the lens assembly 144 thereof. With further reference to FIG. 7, the camera device 120 is substantially concealed by the mullion assembly 70 as received in the receiving recess 80 thereof when the mullion assembly 70 is in the retracted position.

Figure 8:
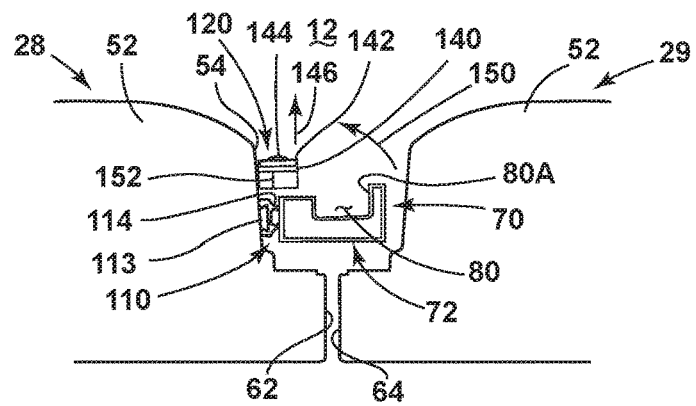
FIG. 8 is a top plan view of the first and second French-style doors and the mullion assembly of FIG. 1 in a closed position, with an image sensor mounted to the first door and facing inwardly.

Referring now to FIG. 8, the first and second doors 28, 29 are again shown in a closed position, such that the inside edges 62, 64 thereof are disposed adjacent to one another. The outer surface 87 of the mullion assembly 70 is shown providing a sealing surface for the first and second doors 28, 29 at the inside edges 62, 64 thereof. Thus, in FIG. 8, the mullion assembly 70 is in the deployed position, wherein the mullion bar 72 is fully extended outwardly from the first hinge element 114 of the first hinge assembly 110. In the embodiment of FIG. 8, the camera device 120 is mounted directly to the outwardly projecting side portion 54 of the first door 28 at an inwardly disposed location relative to the first hinge assembly 110 and mullion assembly 70. In the embodiment of FIG. 8, the outwardly projecting side portion 54 of the first door 28 makes up a portion of the inside edge 62 of the first door 28. Thus, in this mounting configuration, the camera device 120 is exposed, such that the front surface 142 and the lens assembly 144 thereof having an unimpeded view into the first compartment 12 of the refrigerator 2 in the direction as indicated by arrow 146.

Figure 9:
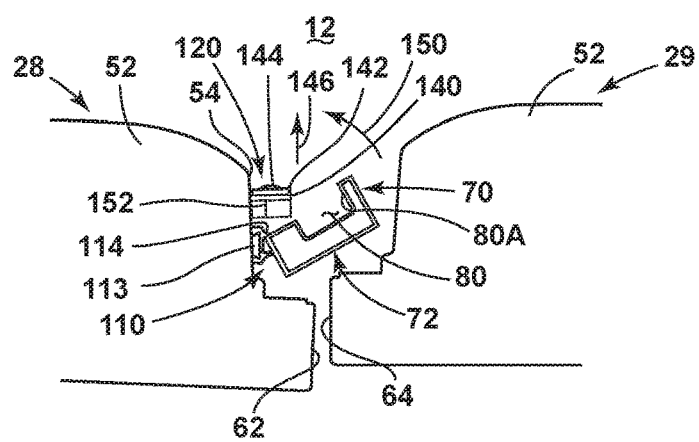
FIG. 9 is a top plan view of the doors and mullion assembly of FIG. 8 showing the first door moving towards an open position with the second door remaining in a closed position, and further showing rotation of the mullion assembly towards an inwardly rotated position.

Referring now to FIG. 9, as the first door 28 moves towards the open position from the closed position shown in FIG. 4, the mullion bar 72 may contact the inner portion 64 of the second door 29 to rotate the mullion assembly 70 from the fully deployed position (shown in FIG. 8) towards the retracted position. As noted above, the unitary guide pin defined by the first and second guide pin portions 74A, 74B of the first and second cover members 72A, 72B of the mullion bar 72 can interact with the guide member 22 disposed within the first compartment 12 to move the mullion assembly 70 towards the retracted position as the first door 28 opens, in a manner as known in the art. As noted above, the mullion assembly 70 moves towards the retracted position with an inward rotational movement along the path as indicated by arrow 150.

Figure 10:
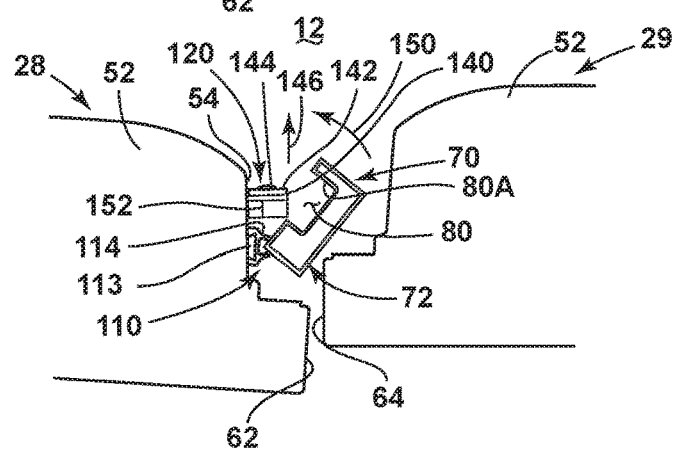
FIG. 10 is a top plan view of the doors and mullion assembly of FIG. 9 showing the first door moving further towards the open position with the second door remaining in the closed position, and the mullion assembly rotated further towards the inwardly rotated position.

Referring now to FIG. 10, the mullion assembly 70 continues to move along the inwardly directed rotational path as indicated by arrow 150 towards the retracted position.

Figure 11:
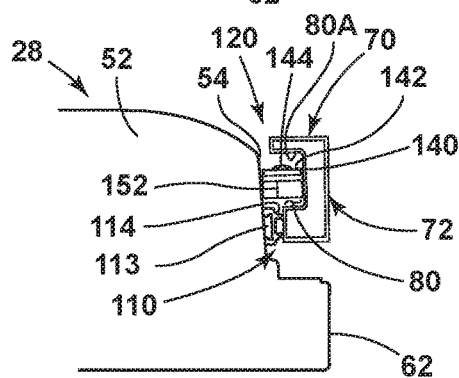
FIG. 11 is a top plan view of the first door and mullion assembly of FIG. 6 showing the first door in the open position, and the mullion assembly fully rotated to the inwardly rotated position, wherein the image sensor is received in a recess disposed on the mullion assembly.

Referring now to FIG. 11, the mullion assembly 70 is shown in the fully retracted position, such that the first door 28 is contemplated to be moved away from the cabinet 4 and the second door 29 of the refrigerator 2 to the open position as shown in FIG. 1. With the mullion assembly 70 in the fully retracted position, the camera device 120, along with the lens assembly 144 thereof, is fully received within the receiving recess 80 of the mullion bar 72, such that the camera device 120 is protected by the mullion assembly 70 from the warmer humid air of the external environment surrounding the refrigerator 2. Specifically, the camera device 120 is covered by the inner wall 80A of the recess 80 when the mullion assembly 70 is in the fully retracted position. In this way, the camera device 120 is less susceptible to condensation by exposure to the external environment of the refrigerator 2 as explained above. Thus, as shown in FIGS. 8-11, the camera device 120 remains stationary as mounted to the first door 28 at the outwardly projecting side portion 54 thereof as the mullion assembly 70 rotates inwardly to cover the camera device 120 in the retracted position. Again, the camera device 120 moves with the first door 28 as the first door 28 rotates between open and closed positions, but the camera device 120 does not change orientation with respect to the first door 28 as fixedly mounted to the outwardly projecting side portion 54 thereof. With further reference to FIG. 11, the camera device 120 is substantially concealed by the mullion assembly 70 as received in the receiving recess 80 thereof when the mullion assembly 70 is in the retracted position.

It will be understood by one having ordinary skill in the art that construction of the described invention and other components is not limited to any specific material. Other exemplary examples of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A refrigerator, comprising:
    a mullion assembly pivotally coupled to a refrigerator door by a hinge assembly, wherein the mullion assembly is operable between retracted and deployed positions, and further wherein the mullion assembly includes a receiving recess; and
    a camera device mounted on the hinge assembly and vertically aligned with the receiving recess of the mullion assembly, wherein the camera device is at least partially received in the receiving recess of the mullion assembly when the mullion assembly is in the retracted position.

2. The refrigerator of claim 1, wherein the camera device includes a lens assembly facing into a storage compartment of the refrigerator when the refrigerator door is in a closed position.

3. The refrigerator of claim 2, wherein the lens assembly of the camera device is covered by an inner wall of the receiving recess when the mullion assembly is in the retracted position.

4. The refrigerator of claim 3, wherein the hinge assembly includes a first hinge element coupled to an inner edge of the refrigerator door.

5. The refrigerator of claim 4, wherein the mullion assembly is mounted to the first hinge element of the hinge assembly.

6. The refrigerator of claim 5, wherein the hinge assembly includes a second hinge element coupled between the first hinge element and the mullion assembly.

7. The refrigerator of claim 6, wherein the second hinge element of the hinge assembly pivots with the mullion assembly relative to the first hinge element as the mullion assembly moves between the retracted and deployed positions.

8. The refrigerator of claim 7, wherein the first hinge element of the hinge assembly is fixedly mounted to the inner edge of the refrigerator door.

9. A refrigerator, comprising:
    a cabinet having a storage compartment;
    first and second doors operably coupled to the cabinet between open and closed positions, the first and second doors each having inner edges that are spaced-apart from one another when the first and second doors are in the closed position;
    a hinge assembly having a first hinge element mounted to the first door, wherein the hinge assembly further includes a second hinge element pivotally coupled to the first hinge element;
    a mullion assembly having a mullion bar coupled to the second hinge element of the hinge assembly for movement between retracted and deployed positions, wherein the mullion assembly includes at least one receiving recess; and
    a camera device mounted on the first hinge element and vertically aligned with the at least one receiving recess of the mullion bar, wherein the camera device faces into the storage compartment when the first door is in the closed position, and further wherein the camera device is at least partially received in the at least one receiving recess of the mullion bar when the mullion bar is in the retracted position, and further wherein the camera device is positioned outside of the at least one receiving recess of the mullion bar when the mullion bar is in the deployed position.

10. The refrigerator of claim 9, wherein the at least one receiving recess includes an inner wall.

11. The refrigerator of claim 10, wherein the camera device includes a lens assembly, and further wherein the lens assembly is at least partially covered by the inner wall of the at least one receiving recess when the first door is in the open position.

12. The refrigerator of claim 10, wherein the camera device includes a lens assembly, and further wherein the lens assembly is at least partially covered by the inner wall of the at least one receiving recess of the mullion bar when the mullion bar is in the retracted position.

13. The refrigerator of claim 9, wherein the first hinge element is fixedly mounted to an inner edge of the first door.

14. The refrigerator of claim 13, wherein an inner surface of the mullion bar rotates inwardly towards the inner edge of the first door when the mullion bar rotates from the deployed position to the retracted position, and further wherein the mullion bar rotates from the deployed position to the retracted position when the first door moves from the closed position to the open position.

15. A refrigerator, comprising:

a door;

a mullion assembly pivotally coupled to the door between deployed and retracted positions, the mullion assembly having at least one receiving recess; and at least one camera device mounted on the door and vertically aligned with the at least one receiving recess of the mullion assembly, wherein the at least one camera device is at least partially received in the at least one receiving recess of the mullion assembly when the mullion assembly is in the retracted position.

16. The refrigerator of claim 15, wherein the mullion assembly rotates inwardly towards an inner edge of the door from the deployed position to the retracted position when the door moves from a closed position to an open position.

17. The refrigerator of claim 15, wherein the at least one camera device includes a plurality of camera devices mounted on the door.

18. The refrigerator of claim 17, wherein the at least one receiving recess includes a plurality of receiving recess disposed along the mullion assembly.

19. The refrigerator of claim 18, wherein each camera device of the plurality of camera devices is at least partially received in an associated receiving recess of the plurality of receiving recesses disposed along the mullion assembly when the door is in an open position.

20. The refrigerator of claim 15, wherein the at least one camera device includes a lens assembly that is at least partially received in the at least one receiving recess of the mullion assembly when the mullion assembly is in the retracted position.

* * * * *